(12) United States Patent
Dentel et al.

(10) Patent No.: US 7,062,451 B1
(45) Date of Patent: Jun. 13, 2006

(54) METHOD FOR FACILITATING THE PURCHASE OF COMPATIBLE PRODUCTS

(75) Inventors: Stephen D. Dentel, Vancouver, WA (US); Michael D. Whitmarsh, Vancouver, WA (US); Johnathan R. Vogt, Vancouver, WA (US); Kirsten Wisdom, Vancouver, WA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 861 days.

(21) Appl. No.: 09/629,254

(22) Filed: Jul. 31, 2000

(51) Int. Cl.
*G06F 17/60* (2006.01)

(52) U.S. Cl. .......................................... 705/26; 705/26
(58) Field of Classification Search ................. 705/26, 705/27, 28; 347/7; 399/9, 12, 24, 25, 26, 399/27, 28, 29, 30; 709/203, 224; 710/10; 717/168, 171–173; 714/25, 26, 33, 37, 40, 714/44

See application file for complete search history.

(56) References Cited

U.S. PATENT DOCUMENTS 5,305,199 A * 4/1994 LoBiondo et al. .......... 364/403
5,845,077 A * 12/1998 Fawcett (Continued)

FOREIGN PATENT DOCUMENTS

JP 10309851 A * 11/1998

OTHER PUBLICATIONS

"McAfee.com Debuts Oil Change Online-the Internet's First Contextual Shopping and Update Service for PC Software, Hardware and Accessories", May 7, 1999 Press Release [archived at http://web.archive.org/web/19990508063912/www.mcafee.com/about/press_releases/pr04149901.asp] [printed May 18, 2003 ].*

(Continued)

*Primary Examiner*—Jeffrey A. Smith (57) ABSTRACT

A system and method for facilitating a user's purchase of products which are compatible for use with a component of the user's processor system. The particular type of the user's component may be determined without input from the user. An intermediary server system is configured to receive a purchase request from the user's processor system specifying the particular type of the component. In one embodiment of the invention, the intermediary server system is configured to identify products which are compatible for use with the particular type of component. If a particular vendor is not specified by the user, the intermediary server system may also identify one or more vendors offering to sell the compatible products. Additionally, the intermediary server system may forward a notification of the purchase request to a vendor server system associated with a selected vendor. The vendor server system is configured to transmit a purchase invitation to the processor system specifying one or more products which are compatible for use with the particular type of component.

9 Claims, 8 Drawing Sheets

U.S. PATENT DOCUMENTS

| | | | |
|---|---|---|---|
| 5,913,210 A * | 6/1999 | Call | 707/4 |
| 6,023,585 A * | 2/2000 | Perlman et al. | 395/712 |
| 6,023,593 A * | 2/2000 | Tomidokoro | 399/8 |
| 6,049,671 A * | 4/2000 | Slivka et al. | 395/712 |
| 6,113,208 A * | 9/2000 | Benjamin et al. | |
| 6,151,643 A * | 11/2000 | Cheng et al. | 710/36 |
| 6,230,199 B1 * | 5/2001 | Revashetti et al. | 709/224 |
| 6,233,408 B1 * | 5/2001 | Allen | 399/8 |
| 6,272,472 B1 * | 8/2001 | Danneels et al. | 705/27 |
| 6,321,262 B1 * | 11/2001 | Springer | 709/223 |
| 6,333,790 B1 * | 12/2001 | Kageyama | 358/1.15 |
| 6,363,359 B1 * | 3/2002 | Gronemeyer et al. | 705/28 |
| 6,405,178 B1 * | 6/2002 | Manchala et al. | 705/29 |
| 6,629,134 B1 * | 9/2003 | Hayward et al. | 709/217 |
| 2003/0041098 A1 * | 2/2003 | Lortz | 709/203 |

OTHER PUBLICATIONS

"Company Overview", May 7, 1999 [archived at http://web.archive.org/web/19990508054758/www.mcafee.com/about/about/company_info.asp] [printed May 18, 2003].*

"Feature Finder", VARbusiness, Manhasset, Feb. 1, 1995.*

* cited by examiner

METHOD FOR FACILITATING THE PURCHASE OF COMPATIBLE PRODUCTS

TECHNICAL FIELD

The present invention relates generally to online shopping, and more particularly to a system and method for enabling a user of a processor system to purchase products which are compatible for use with a particular type of component of the processor system.

BACKGROUND ART

The rising popularity of the Internet in recent years has created a strong incentive for people to own a personal computer. In addition, as moderately-priced computers have become available, the personal computer has been transformed into a recreational and entertainment device rather than just a tool for the business and scientific community. However, as a result of the complexity of modern computers, many computer users are unable even to identify the particular hardware and software components that make up their computer.

For example, this situation often occurs when a computer user wishes to purchase supplies for their computer over the Internet. To ensure the user purchases the correct supplies, the user must first determine which types of supplies are compatible with the computer by consulting equipment manuals or determining the manufacturer and model of the various components of the computer. This can be difficult and frustrating to users with little technical training or skills. Thus, it would be preferable if the information could be determined automatically and communicated to the external site without the user's involvement.

SUMMARY OF THE INVENTION

The invention provides a system and method for facilitating a user's purchase of products which are compatible for use with a component of the user's processor system. The invention includes an intermediary server system configured to receive a purchase request from the user's processor system specifying the particular type of the user's component. The particular type of the component may be determined without input from the user. In one embodiment of the invention, the intermediary server system is configured to identify products which are compatible for use with the particular type of component. If a particular vendor is not specified by the user, the intermediary server system may also identify one or more vendors offering to sell the compatible products. Additionally, the intermediary server system may forward a notification of the purchase request to a vendor server system associated with a selected vendor. The vendor server system then transmits a purchase invitation to the processor system specifying one or more products which are compatible for use with the particular type of component.

DETAILED DESCRIPTION OF AN EXEMPLARY EMBODIMENT AND BEST MODE FOR CARRYING OUT THE INVENTION

Figure 1:
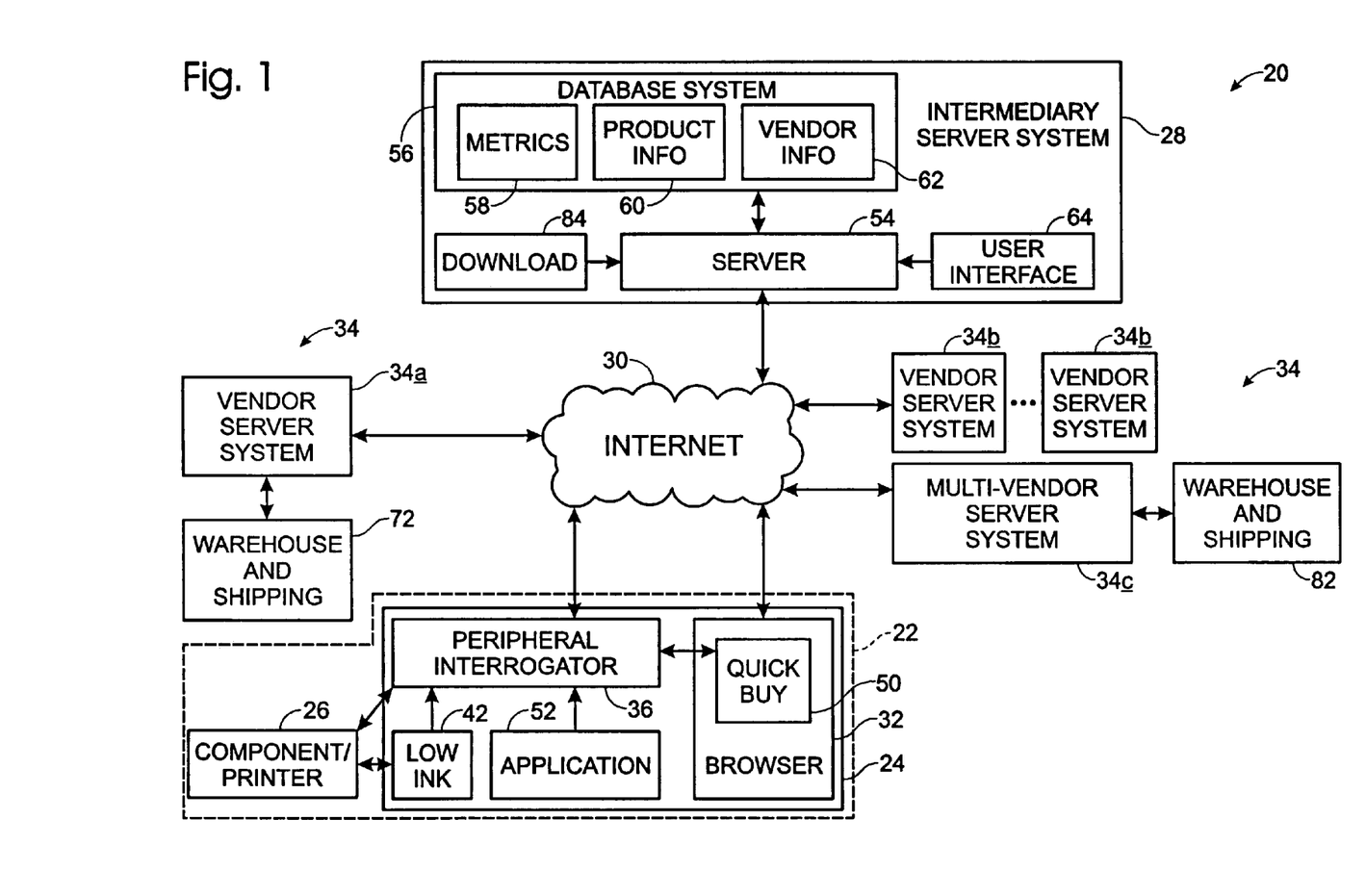
FIG. 1 is a schematic block diagram of an exemplary system for facilitating a purchase according to the present invention.

An exemplary system, in accordance with the present invention, for enabling a user to purchase products that are compatible for use with a component of a processor system is indicated generally at 20 in FIG. 1. System 20 includes a processor system 22 having a processor 24 and one or more components 26. Processor system 22 is configured to transmit a purchase request to intermediary server system 28 via communications network 30. The purchase request identifies the particular type of at least one component 26 so that the products which are compatible for use with component 26 may be identified.

Processor system 22 may be a network computer, a personal computer, a set-top box, a personal digital assistant, or any other similar device having a computer processor configured to execute computer software. In addition to processor 24 and component 26, the processor system may also include one or more display devices (not shown) such as a monitor, and one or more user-input devices (not shown) such as a keyboard, mouse, touch-screen, etc.

Processor 24 typically includes a variety of components as are known to those of skill in the art, including a central processing unit, one or more memory storage devices, data buses, input/output ports, modem, network card, etc. Processor 24 is operably associated with components 26, which may include one or more of a variety of different sorts of components adapted for use with processor 24, such as printers, facsimile machines, scanners, cameras, data storage devices, etc. In the exemplary embodiment shown and described herein, component 26 is a peripheral device, and more particularly a printer. However, it will be understood that component 26 may be any sort of component adapted for use with a processor system. Furthermore, while system 20 is shown as having a single processor system for use by a single user, it will be appreciated that system 20 is adapted for use by a large plurality of users, each having their own processor system with different types of components.

As is known to those of skill in the art, there are many different sorts of products for use with the various components. For example, printers use ink or toner cartridges, print heads, pens, and similar devices, as well as various printer media such as paper, cardstock, transparencies, etc. System 20 may be configured to enable a user to purchase of any of these different sorts of products for use with any of the various sorts of components. Alternatively, system 20 may enable a user to purchase other products. In one exemplary embodiment, system 20 enables a purchase by determining the particular type of the user's component without input from the user. This allows the identification of products which are compatible for use with the particular type of component.

As used herein, the particular "type" of a component 26 is an identification that specifies not only the specific sort of the component (e.g., printer, scanner, camera, etc.), but also the particular model or configuration of the component which distinguishes it from similar sorts of components. Thus, the particular type of a component will identify the component sufficiently so that products compatible for use with the particular type will be compatible with every component of similar type. For example, one particular type of component might be an HP970Cse inkjet printer. Any products which are compatible for use with one HP970Cse inkjet printer will be compatible for use with all HP970Cse inkjet printers. In addition, the particular type of a component typically will also specify any optional configurations that effect which products are compatible with the component (e.g., duplex printing capability, etc.). Once the particular type of a user's component has been determined, products that are compatible for use with the user's component can be identified.

As will be described in more detail below, processor system 22 of the exemplary embodiment is configured to determine the particular type of component 26 (hereinafter printer 26) and to transmit a purchase request via communications network 30. Communications network 30 may be any one device or combination of devices and/or media for transmitting computer information between remote locations including a local area network (LAN), wide area network (WAN), intranet, extranet, wireless broadcast, etc. For example, network 30 may be the global communications network commonly known as the Internet.

Processor system 22 may be configured to transmit information via Internet 30 using standard Internet communications protocols. In an exemplary embodiment of the invention, processor system 22 includes a network communication application such as an Internet navigation interface or browser 32 that is executable by processor 24 to communicate via Internet 30. Browser 32 may be any suitable browser such as MICROSOFT INTERNET EXPLORER, NETSCAPE NAVIGATOR, etc.

Processor system 22 is connected to one or more remote server systems via Internet 30. Browser 32 is adapted to communicate with the server systems using the TCP/IP (Transmission Control Protocol/Internet Protocol) protocol suite to transmit HTTP (Hypertext Transport Protocol) commands. The browser may receive information from the various server systems formatted as HTML (Hypertext Markup Language) files. Browser 32 is configured to display the HTML files to the user in the form of Internet "web pages" which serve as interactive user-interfaces. Alternatively, other communication protocols and formats may be used. For example, some information may be communicated using secure protocols such as HTTPS (Secure Hypertext Transport Protocol) or similar encrypted communication methods.

In response to one or more actions by the user, processor system 22 is adapted to transmit a purchase request to intermediary server system 28 via Internet 30. In the exemplary embodiment, processor 24 is adapted to determine the particular type of printer 26 without input from the user, and to specify the particular type of the printer in the purchase request. Alternatively, the user may input the particular type of printer 26, or the particular type of a different printer/component. Typically, the purchase request is a message signifying the user's interest in purchasing one or more products for use with printer 26, rather than an instruction to execute a purchase transaction. Alternatively, the purchase request may also serve as authorization by the user to execute a purchase transaction.

Processor 24 may be configured to determine the particular type of printer 26 in any of a variety of ways within the scope of the invention. In the exemplary embodiment, processor 24 includes a peripheral interrogator 36, such as described in U.S. patent application Ser. No. 09/499,876, filed Feb. 8, 2000 (pending)(the '876 application) the disclosure of which is herein incorporated by reference. As described in the '876 application, peripheral interrogator 36 may be a browser plug-in executable by processor 24 to poll the processor operating system and/or printer driver to determine the particular type of the printer. Alternatively, peripheral interrogator 36 may be configured to determine the particular type of a component in various other ways known to those of skill in the art.

Peripheral interrogator 36 is configured to transmit the purchase request to intermediary server system 28 along with the particular type of printer 26. The purchase request may take any desired form. In the exemplary embodiment, peripheral interrogator 36 formats the purchase request as one or more key/value pairs embedded in a GET URL instruction transmitted to the intermediary server system. While the peripheral interrogator is depicted in FIG. 1 as independent of browser 32, it will be understood that the peripheral interrogator typically is configured to communicate with Internet 30 through the browser. Alternatively, the peripheral interrogator may be configured to communicate via the Internet directly.

In one embodiment of the invention, peripheral interrogator 36 is adapted to determine the particular type of printer 26, and to inform intermediary server system 28 of the particular type in response to a single action by the user. It will be appreciated that the single action may be any type of action by the user to issue a command to the peripheral interrogator. Typically, processor 24 is configured to display a user-interface including at least one command element. The user may select or actuate the command element by performing a single action such as entering a command via a keyboard, operating a mouse to select the command element, etc. In any event, actuation of the command element by the user calls the peripheral interrogator 36 to determine the particular type of printer 26, and to transmit the information to intermediary server system 28. The peripheral interrogator may either specify the particular type of the printer as part of a purchase request, or may communicate the particular type of the printer in a separate transmission to the intermediary server system.

Figure 2:
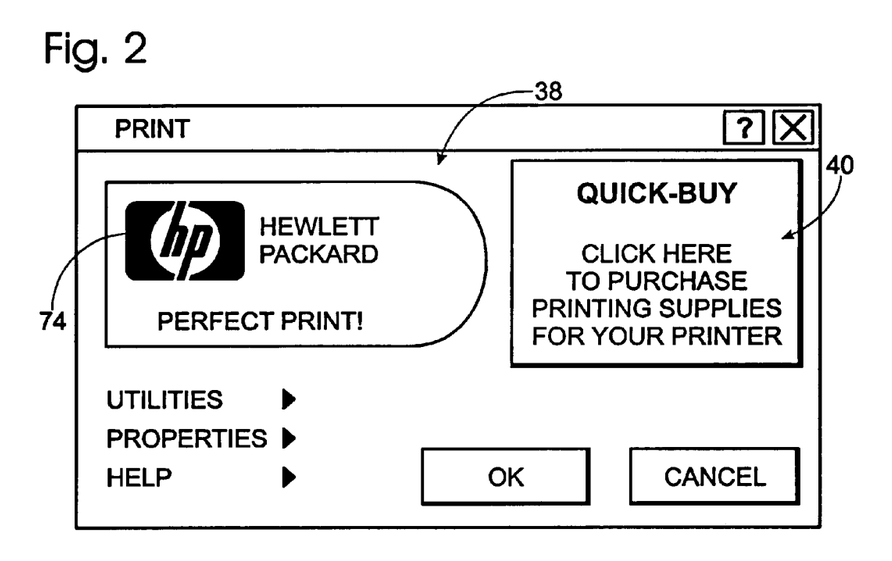
FIG. 2 is a schematic representation of an exemplary print dialog interface according to the present invention.
Figure 3:
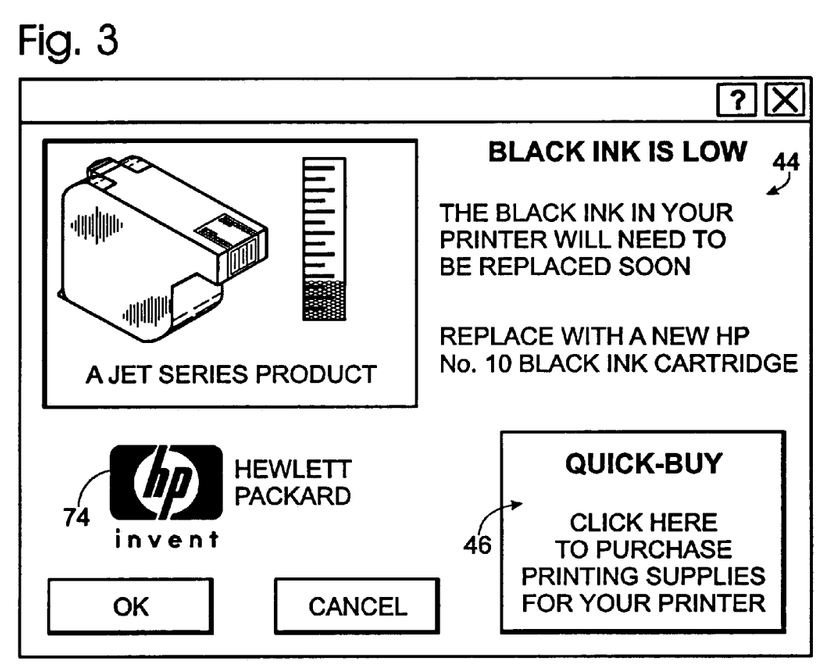
FIG. 3 is a schematic representation of an exemplary low-ink dialog interface according to the present invention.
Figure 4:
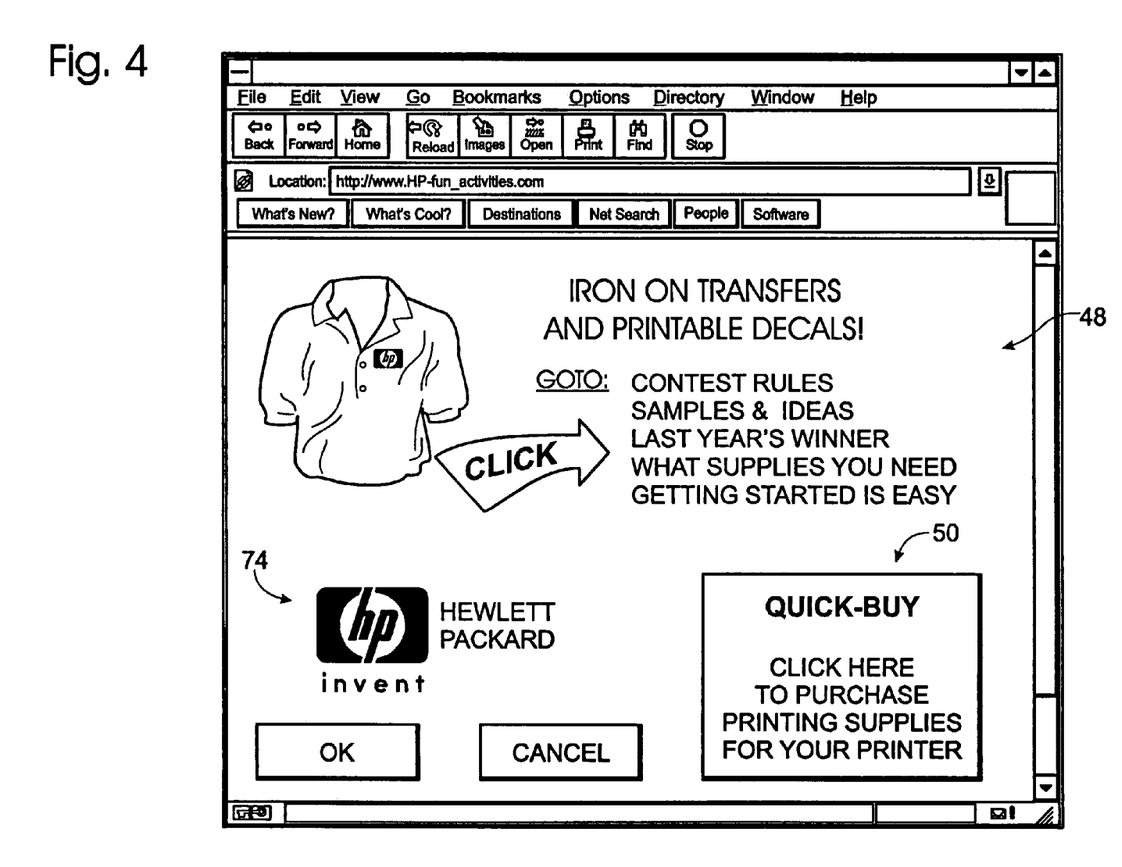
FIG. 4 is a schematic representation of an exemplary vendor web page containing a Quick-Buy Button according to the present invention.

Processor 24 may be configured to display a command element to the user continuously, or in response to the occurrence of selected conditions. Processor 24 may also be configured to display different command elements under different conditions. FIGS. 2–4 illustrate three examples of user interfaces having command elements that are selectable to actuate peripheral interrogator 36 by a single act of the user.

In FIG. 2, an exemplary print dialog interface 38 is shown. The print dialog is displayed by processor 24 when the user instructs the processor to print a document. The print dialog may be produced by the operating system, or the printer driver, or an application program, etc. In any event, print dialog 38 includes a command element in the form of a Quick-Buy Button 40. The user may operate the mouse or other input device to select (i.e., click on) Quick-Buy Button 40, thereby calling the peripheral interrogator function. In response to this single action by the user, peripheral interrogator 36 determines the particular type of printer 26 and transmits a purchase request which specifies the particular printer type to the intermediary server system. The purchase request may also specify one or more particular sorts of products (e.g., ink cartridges, etc.), or may request purchase information regarding all compatible products.

FIG. 3 shows an exemplary low-ink dialog interface 44 which is displayed by a low-ink module 42 in response to the detection of a low-ink status in printer 26. As is known to those of skill in the art, some printers are configured to detect a low-ink condition in the ink cartridge, print head, etc. (e.g., the HP 970Cse inkjet printer available from Hewlett-Packard of Palo Alto, Calif.). In the exemplary embodiment, the low-ink status is reported from printer 26 to low-ink module 42 on processor 24. The low-ink module may be a printer driver configured to control printer 26, or may be a separate program configured to communicate with the printer. In any event, module 42 is adapted to display a low-ink dialog 44 when a low-ink status is detected. Dialog 44 includes Quick-Buy Button 46 similar to Quick-Buy Button 40. If the user performs the single act of selecting Quick-Buy Button 46, peripheral interrogator 36 is called to determine the particular type of printer 26. The peripheral interrogator then transmits a purchase request to intermediary server system 28 specifying the particular printer type. Alternatively, low-ink module 42 may be configured to determine the particular type of printer 26, and to transmit the purchase request to the intermediary server system.

FIG. 4 shows an exemplary web page 48 transmitted by a vendor server system 34 associated with a particular vendor. Web page 48 is typically transmitted to processor system 22 in response to a GET URL instruction from browser 32 that specifies the Internet address and path of the web page. The web page is displayed to the user by browser 32, and includes a Quick-Buy Button 50, in the form of a hypertext link. When the user performs the single act of selecting the Quick-Buy Button, the peripheral interrogator function is called to determine the particular type of printer 26. The peripheral interrogator then transmits a purchase request to intermediary server system 28 specifying the particular printer type.

It will be appreciated by those of skill in the art that the examples depicted in FIGS. 2–4 and described above are just a few of the many methods by which a user can operate processor system 22 to transmit a purchase request. Additionally, processor 24 may include one or more applications 52 configured to call peripheral interrogator 36, or to transmit the purchase request directly. For example, an on-line service provider such as AMERICA ONLINE may incorporate a Quick-Buy Button into its user-interface. Similarly, a Quick-Buy command may be incorporated into the pull-down menus of applications 52. Further, browser 32 may incorporate a command element into its user-interface as a toolbar button or similar feature. Thus, it will be understood that processor 24 may be configured to allow a user to initiate a purchase request by any action or sequence of actions. Alternatively, peripheral interrogator 36 may be called under selected conditions without any action being performed by the user.

In addition to specifying the particular type of printer 26, peripheral interrogator 36 may also be configured to specify a product vendor in the purchase request. The identity of a particular product vendor may be determined or selected in a variety of ways. As one example, in the embodiment depicted in FIG. 4, where the user actuates the Quick-Buy Button from within the website of a particular vendor, the purchase request may specify that particular vendor. Alternatively, the purchase request may specify a partner of that particular vendor. In any event, the process of transmitting a purchase request specifying both the particular type of printer and a particular vendor may be accomplished in response to only a single action by the user. For instance, Quick-Buy Button 50 may be configured as a hypertext link that specifies a particular vendor as well as the URL of intermediary server system 28. In response to the user's selection of Quick-Buy Button 50, the peripheral interrogator is configured to determine the particular type of printer 26, and then execute a GET URL instruction directed at the intermediary server system. The peripheral interrogator is also configured to embed the particular type of the printer and the particular vendor in the GET URL instruction. Alternatively, the purchase request may be transmitted to the intermediary server system by any other suitable method.

As another example of how a particular vendor may be selected, the identities of one or more vendors may be stored on processor 24 or printer 26 so that whenever processor system 22 transmits a purchase request, the identity of at least one of the vendors is transmitted with the request. This would enable a particular vendor (e.g., the manufacturer of the processor or the printer, etc.) to receive all of the user's purchase requests. Alternatively, different applications may identify different vendor identities so that the purchase request would specify a first vendor if the user selected a Quick-Buy Button within a first application, but the purchase request would specify a second vendor if the user selected a Quick-Buy Button within a second application. As a further alternative, the user could be queried to select a vendor before the purchase request is transmitted.

Typically, though not necessarily, the identity of a particular vendor will be selected by one of a plurality of methods depending on the context in which the purchase request is transmitted. For example, a purchase request initiated in the context of a low-ink warning might specify a vendor stored within low-ink module 42, while a purchase request initiated in the context of browsing a particular vendor's website might specify that particular vendor. It will be appreciated that numerous combinations of methods may be used to select a vendor within the scope of the invention.

As discussed above, processor system 22 is configured to communicate with various server systems via Internet 30, including intermediary server system 28 and one or more vendor server systems 34. As used herein, a server system may include a single server or may include a plurality of servers, and may reside on a single computer system or be distributed across a plurality of interconnected computer systems. Typically, a server system is configured to receive and respond to communications from multiple different processor systems via Internet 30. A server system may also be any one or combination of different types of servers including application servers, web servers, database servers, etc. In addition, a server system may include a variety of different applications and/or resources such as databases, interfaces, connections to other server systems or third-party service providers, etc.

Intermediary server system 28 includes at least one server 54 configured to receive purchase requests from processor system 22, and to facilitate the user's purchase of products in at least one of several ways. In the exemplary embodiment, server 54 is configured to receive the GET URL instruction from the processor system and to extract the embedded purchase request. Server 54 then processes the purchase request in accordance with the configuration of the server and/or the format of the purchase request. As described in more detail below, server 54 may be configured to identify which of plural products are compatible for use with the user's particular type of printer. Alternatively, server 54 may be configured to identify which vendors are able to satisfy the user's purchase request. As a further alternative, server 54 may be configured to first identify compatible products and then to identify vendors offering to sell the compatible products. After identifying the compatible products and/or vendors, server 54 may be configured to forward a notification of the purchase request to a vendor server system 34 associated with a selected vendor. Alternatively, the user may contact the vendor independently.

Intermediary server system 28 also includes a database system 56 having one or more databases 58, 60, 62, which may have any suitable database structure. The databases are accessible by server 54 to store and retrieve information either directly, or through a database server (not shown). Alternatively, database system 56 or one or more of databases 58, 60, 62, may be separate from the intermediary server system and accessible by server 54 via a communications network such as Internet 30.

Where the purchase request specifies a particular type of a component, server 54 may be configured to identify which products are compatible with the particular type of component by accessing product information database 60. The product information database contains information regarding multiple types of components and the products compatible for use with each component. It will be appreciated that storing product information on a central database rather than on multiple processor systems allows the product information to be modified easily and at a single location.

In the exemplary embodiment, server 54 is configured to search product information database 60 to identify which of plural products are compatible for use with the particular type of printer 26. If the purchase request specifies a particular sort of product (e.g., ink cartridge, cardstock, etc.), server 54 may be configured to identify which products of the particular sort are compatible for use with printer 26. If the purchase request does not specify a particular sort of product, server 54 may be configured to identify all products which are compatible with the particular type of printer. Alternatively, server 54 may be configured to transmit an instruction to processor system 22 to query the user to determine which sort of product the user wishes to purchase.

If the purchase request does not specify a vendor, server 54 may be configured to identify a vendor offering to sell products compatible with the particular type of printer 26. Server 54 may identify vendors by any of a variety of methods, including querying vendors, etc. In the exemplary embodiment, server 54 is configured to search vendor information database 62 to identify vendors offering to sell compatible products.

Vendor information database 62 contains information regarding a plurality of vendors and the products offered for sale by each vendor. The vendor information database may also contain information regarding submitting purchase requests to each vendor. For example, database 62 may include address and telephone numbers for contacting each vendor.

Database 62 may also include the network address of a vendor server system associated with each vendor. It will be appreciated that a particular vendor may be associated with plural server systems configured to provide different or similar functions. Thus, a purchase request which is initiated by selecting a Quick-Buy Button within a vendor's website may be directed to a different server system than the server system which supports the website. Similarly, purchase requests intended for a single vendor may be directed to one of multiple different vendor server systems depending on the product to be purchased. Alternatively, a vendor may wish to direct all purchase requests initiated within its web site to the vendor server system of a partner vendor. Preferably, vendor information database 62 contains information specifying which vendor server system a purchase request should be directed to for each of plural vendors.

Figure 5:
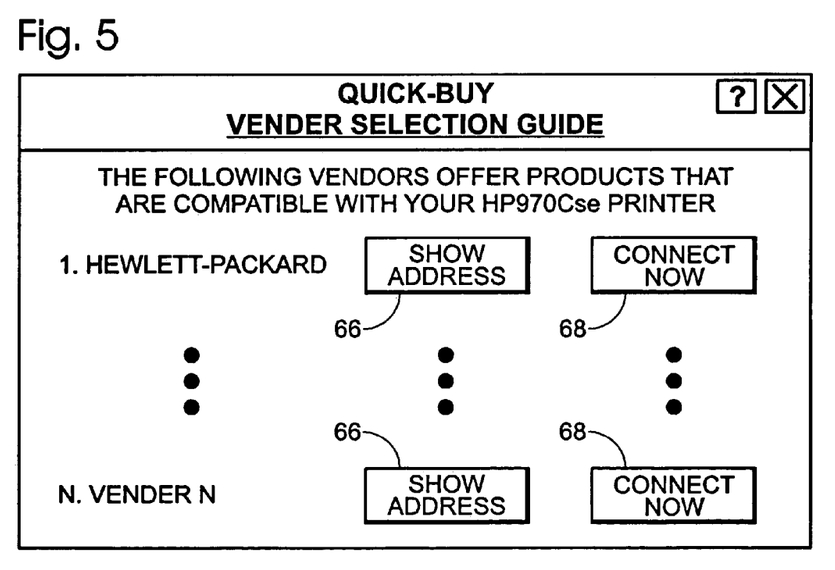
FIG. 5 is a schematic representation of an exemplary user-interface according to the present invention, which allows a user to select a vendor offering to sell products compatible for use with the user's printer.

In one embodiment of the invention, intermediary server system 28 includes a user-interface 64 configured to display a list of vendors to the user and allow the user to select a particular vendor. In this embodiment, server 54 responds to the purchase request by identifying one or more vendors offering to sell compatible products, and then transmitting user-interface 64 to processor system 22 for display by browser 32. User-interface 64 may be in the form of a web page, such as illustrated in FIG. 5. User-interface 64 includes user-selectable command elements 66 by which the user may select a vendor and request the address and telephone number of the selected vendor. The user-interface also includes user-selectable command elements 68 by which the user may instruct server 54 to forward a notification of the purchase request to the vendor server system associated with the selected vendor. Optionally, user-interface 64 may provide pricing information for one or more vendors to allow the user to select a vendor based, at least in part, on comparative prices.

In an alternative embodiment, server 54 may be configured to select one of the identified vendors without input from the user. Server 54 may then inform the user of the selected vendor and/or forward a notification of the purchase order to the vendor server system associated with the selected vendor.

If the purchase request does specify a particular vendor, server 54 may be configured to access vendor information database 62 to identify a vendor server system associated with the specified vendor. Alternatively, the purchase request may specify a vendor server system associated with the vendor. In any event, server 54 may then forward a notification of the purchase request to the identified vendor server system.

The notification of a purchase request may be the same as, or different than, the original purchase request received by intermediary server system 28. In the exemplary embodiment, the notification includes the Internet address of processor system 22 so that vendor server system 34 may respond directly to the purchase request. As discussed above, the notification may also include a list of products that are compatible for use with printer 26. Alternatively, vendor server system 34 may be configured to identify compatible products independently. In any event, the vendor server system is configured to respond to the purchase request by transmitting a purchase invitation to processor system 22 via Internet 30. An exemplary purchase invitation in the form of a user-interface web page is shown generally at 70 in FIG. 6.

Figure 6:
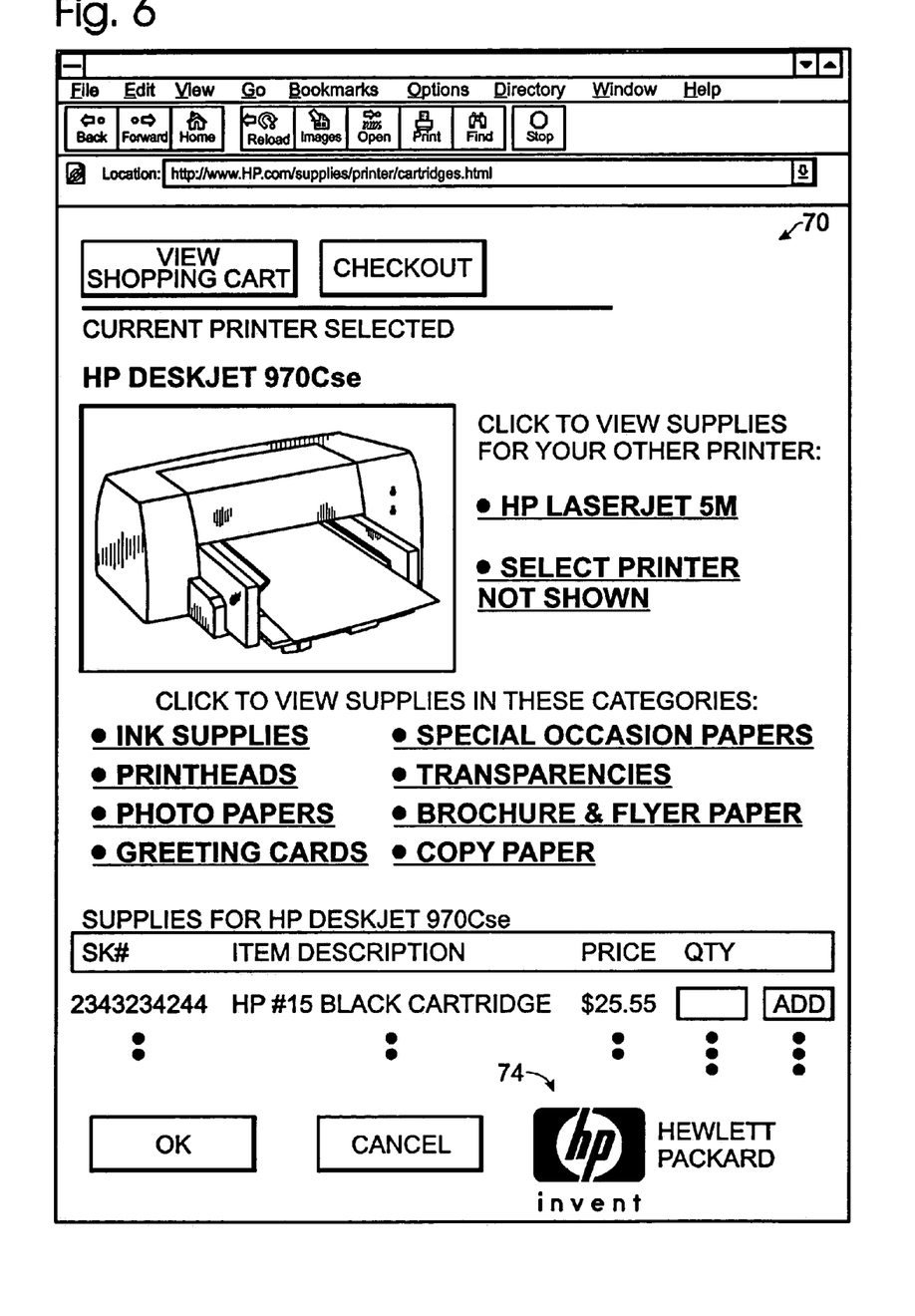
FIG. 6. is a schematic representation of an exemplary purchase invitation web page according to the present invention.

Purchase invitation 70 specifies one or more products compatible for use with printer 26. Typically, only products which are compatible with printer 26 are listed on the web page. Thus, the user is assured that any product selected from the purchase invitation will be compatible with printer 26. Alternatively, the compatible products may be distinguished from non-compatible products by various indicia such as groupings, headings, highlighting, etc.

As shown in FIG. 6, the purchase invitation may also identify the particular type of printer 26 and may allow the user to request products for other components. Typically, the purchase invitation user-interface allows the user to select one or more products for purchase and then proceed with an on-line purchase of the selected products. Alternatively, the user may purchase the products by phone, mail, in person, etc.

As described above, system 20 is configured to facilitate a user's purchase of products in a variety of ways. System 20 enables the particular type of a component of the user's processor system to be determined without input from the user. In one embodiment, system 20 allows a selected vendor to transmit a component-specific purchase page for display to the user in response to only a single action by the user to indicate an interest in purchasing a product. System 20 may also enable the user to locate a vendor offering to sell products compatible with the particular type of the user's component.

In another embodiment of the invention, at least one of vendor server systems 34 is configured to identify which products are compatible with a particular type of component. For example, a particular vendor server system 34 may be configured to access product information database 60 to identify compatible products. Alternatively, a particular vendor server system may be configured to identify compatible products by any other suitable means.

In this embodiment, vendor information database 62 contains information specifying whether the vendor server system associated with each vendor is configured to identify products which are compatible for use with the particular type of printer 26. Server 54 is configured to search database 62 to determine whether the vendor server system associated with the selected vendor can identify compatible products. If the particular vendor server system cannot identify the compatible products, server 54 then searches product information database 60 and specifies the compatible products in the purchase request notification. Conversely, if the particular vendor server system can identify compatible products, server 54 may be configured to omit the compatible products from the notification.

In a further embodiment of the invention, system 20 includes different types of vendor server systems 34*a*, 34*b*, and 34*c*. Referring back to FIG. 1, vendor server system 34*a* is associated with a vendor capable of satisfying a user's purchase request. Vendor server system 34*a* is configured to satisfy purchase transactions by receiving, executing and fulfilling the purchase request notification according to known online purchasing methods. Vendor server system 34*a* is associated with a warehouse and shipping entity 72 capable of delivering purchased products to a user. When a user executes a purchase through vendor server system 34*a*, entity 72 ensures delivery of the purchased product to the user. While only a single vendor server system 34*a* is shown, it will be appreciated that system 20 may include a plurality of vendor server systems 34*a* associated with a plurality of vendors.

In contrast to vendor server system 34*a*, vendor server systems 34*b* are associated with vendors which are not capable of satisfying a purchase request. Thus, vendor server systems 34*b* are not configured to receive, execute or fulfill a purchase request notification. However, as described in more detail below, multi-vendor server system 34*c* is configured to satisfy purchase requests on behalf of one or more of such vendors. Additionally, the multi-vendor server system may also satisfy purchase requests on behalf of vendors who can supply some products but not the specific product requested by the user. While only a single multi-vendor server system is shown, it will be appreciated that system 20 may include a plurality of multi-vendor server systems.

In this further embodiment, vendor information database 62 contains information specifying whether each vendor and its associated vendor server system(s) are configured to satisfy purchase requests. Server 54 is configured to search database 62 to determine whether the selected vendor can satisfy a purchase request. If the selected vendor can satisfy the purchase request, a notification of the request is forwarded to the vendor server system associated with the selected vendor. If the vendor cannot satisfy the purchase request, server 54 may be configured to forward the purchase request notification to multi-vendor server system 34*c*. In other words, a selected vendor who cannot satisfy a purchase request would then be associated with multi-vendor server system 34*c* to execute the user's purchase. Alternatively, server 54 may be configured to send a message to the user if the selected vendor cannot satisfy the purchase request.

Typically, server 54 is configured to forward the purchase request to multi-vendor server system 34*c* without input from the user. Additionally, multi-vendor server system 34*c* may be configured to simulate a vendor server system 34*b* operated by the selected vendor. Thus, the user's purchase experience is not interrupted. Indeed, multi-vendor server system 34*c* may be configured to transmit a component-specific purchase page to processor system 22 without any input from the user. As a result, a user may receive a component-specific purchase page by performing a single action even where the vendor selected by the user is not capable of satisfying the user's purchase request. To enable the multi-vendor server system 34*c* to simulate the selected vendor, the purchase request notification will typically specify the selected vendor.

Multi-vendor server system 34*c* may be configured to simulate vendor server system 34*b* in any of a variety of ways. For example, as illustrated in FIG. 4, the web site user-interfaces of many vendors include one or more indicia 74 that correspond to the vendor. Indicia 74 may include trademarks, logos, designs, fonts, color schemes, multimedia presentations, web page arrangement, etc. Multi-vendor server system 34*c* may be configured to transmit a user-interface purchase web page, such as illustrated in FIG. 6, that incorporates some or all of indicia 74. The user-interface transmitted by multi-vendor server system 34*c* may also include other features to simulate the user-interface of vendor server system 34*b*, such as links to the selected vendor's web pages, etc. Thus, the purchase environment experienced by the user through the user-interface web page may appear to be an environment hosted by the selected vendor. As a result, vendors are able to engage in online commerce without incurring the capital costs which are usually involved.

Figure 7:
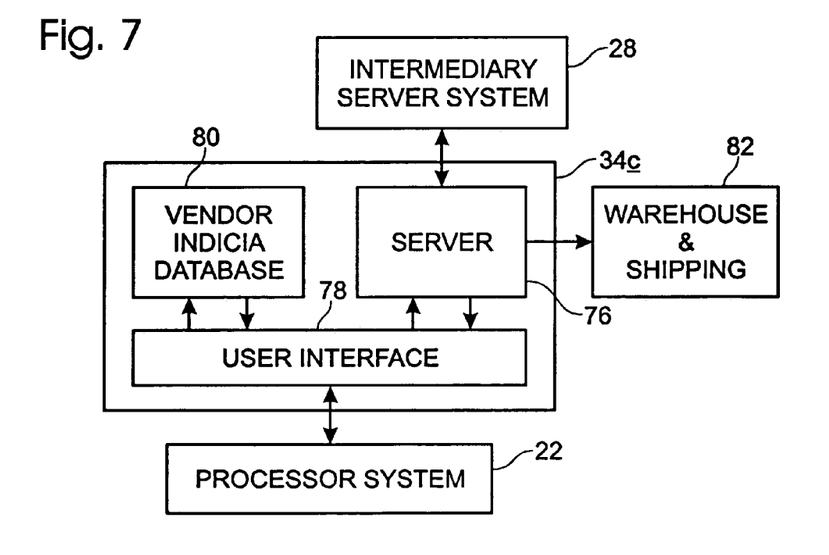
FIG. 7. is a schematic block diagram of an exemplary multi-vendor server system according to the present invention.

In the exemplary embodiment depicted in FIG. 7, multi-vendor server system 34*c* includes a server 76 adapted to receive notifications of purchase requests from intermediary server system 28 via Internet 30. Multi-vendor server system 34*c* also includes a user-interface module 78 adapted to format purchase invitation web pages to simulate the web site of one or more vendors. A vendor indicia database 80 contains information regarding indicia and other features corresponding to one or more vendors. User-interface module 78 is configured to access vendor indicia database 80 to retrieve the indicia and other features corresponding to the vendor specified in a purchase request notification. Alternatively, the vendor indicia database may be located on database system 56, or otherwise accessible by server 54, so that the notification of the purchase request may include the corresponding vendor indicia.

Server 76 is adapted to respond to a purchase request notification by transmitting a purchase invitation created by user-interface module 78 to processor system 22 via Internet 30. The purchase invitation user-interface is displayed by browser 32, and allows the user to select a product to purchase and initiate a purchase transaction. Multi-vendor server system 34c is associated with a warehouse and shipping entity 82. When a user makes a purchase through multi-vendor server system 34c, entity 82 ensures delivery of the purchased products to the user on behalf of the selected vendor.

Returning attention to FIG. 1, intermediary server system 28 may be configured to compile and track various data corresponding to the purchase requests received from users. In the exemplary embodiment, server 54 is configured to record selected information concerning each purchase request received and each purchase request notification transmitted to vendor server systems 34. Server 54 is configured to store the recorded information on metrics database 58. The stored information may be used by the intermediary server system administrator for various purposes such as tracking system usage, management of system resources, advertisement targeting, etc.

Intermediary server system 28 may also include a peripheral interrogator download module 84. When a user's processor system does not include peripheral interrogator 36, the user can download the peripheral interrogator from the intermediary server system. In the exemplary embodiment, browser 32 is configured to prompt the user to download the peripheral interrogator if the user selects a Quick-Buy Button and peripheral interrogator 36 has not previously been installed.

In the exemplary embodiments described above, intermediary server system 28 is configured to receive a purchase request and then forward a notification of the purchase request to a vendor server system associated with the selected vendor. Communications are then established between processor system 22 and the vendor server system, and the purchase transaction is completed without further involvement by the intermediary server system. However, it will be appreciated that other methods of satisfying a purchase request are also within the scope of the invention. As one example, the vendor server system may respond to a purchase request notification by transmitting a purchase page user-interface to intermediary server system 28, which then forwards the purchase page to processor system 22. Thus, communications between the processor system and the intermediary server system are maintained, and the purchase transaction is completed through the intermediary server system.

As described above, system 20 enables one or more of a variety of computer-implemented methods for facilitating a user's purchase of products for use with a peripheral device or other component of the user's processor system. One method, indicated generally at 100 in FIG. 8, includes, at step 110, determining the particular type of the peripheral device without input from the user. Step 110 is typically performed by the processor system, which then informs the intermediary server system of the particular type of peripheral device, as indicated at step 120. The intermediary server system then identifies one or more vendors offering to sell products compatible for use with the particular type of peripheral device, as indicated at step 130.

Figure 8:
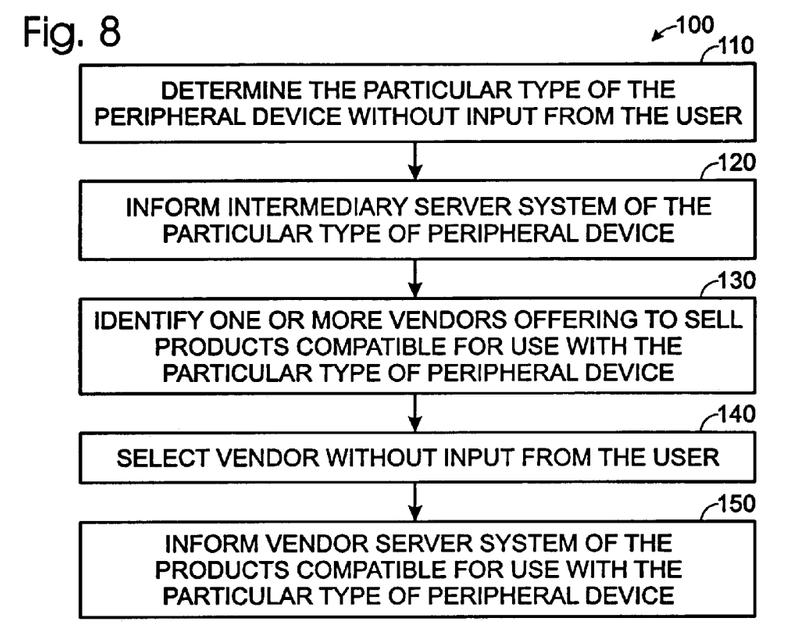
FIG. 8 is a flowchart illustrating a method of facilitating a purchase according to the present invention.

The intermediary server system may then transmit a list of the identified vendors for display to the user. Alternatively, the intermediary server system may select one of the identified vendors without input from the user, as indicated at step 140. The intermediary server system then informs a vendor server system associated with the selected vendor of the products compatible for use with the particular type of peripheral device, as indicated at 150. In the exemplary embodiment of the invention, the intermediary server system informs the vendor server system of the compatible products by forwarding a purchase request notification to the vendor server system, and specifying the compatible products in the notification.

Figure 9:
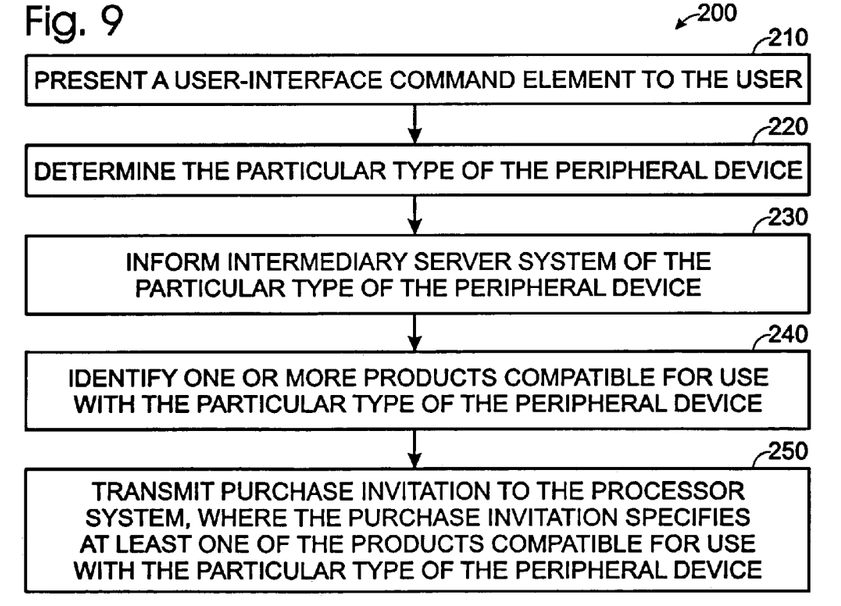
FIG. 9 is a flowchart illustrating a method of facilitating a purchase according to the present invention.

Another method according to the present invention is indicated generally at 200 in FIG. 9. Method 200 includes presenting a user-interface command element to a user, as indicated at step 210. The particular type of the peripheral device is then determined, as indicated at step 220. Next, the intermediary server system is informed of the particular type of the peripheral device, at step 230. One or more products are then identified which are compatible for use with the particular type of the peripheral device, as indicated at step 240. Finally, a purchase invitation is transmitted to the user's processor system, as indicated at step 250. The purchase invitation specifies at least one of the products compatible for use with the particular type of peripheral device. In one embodiment, steps 220–250 are performed in response to a single action by the user to actuate the command element presented at step 210, and no further user input is necessary.

Figure 10:
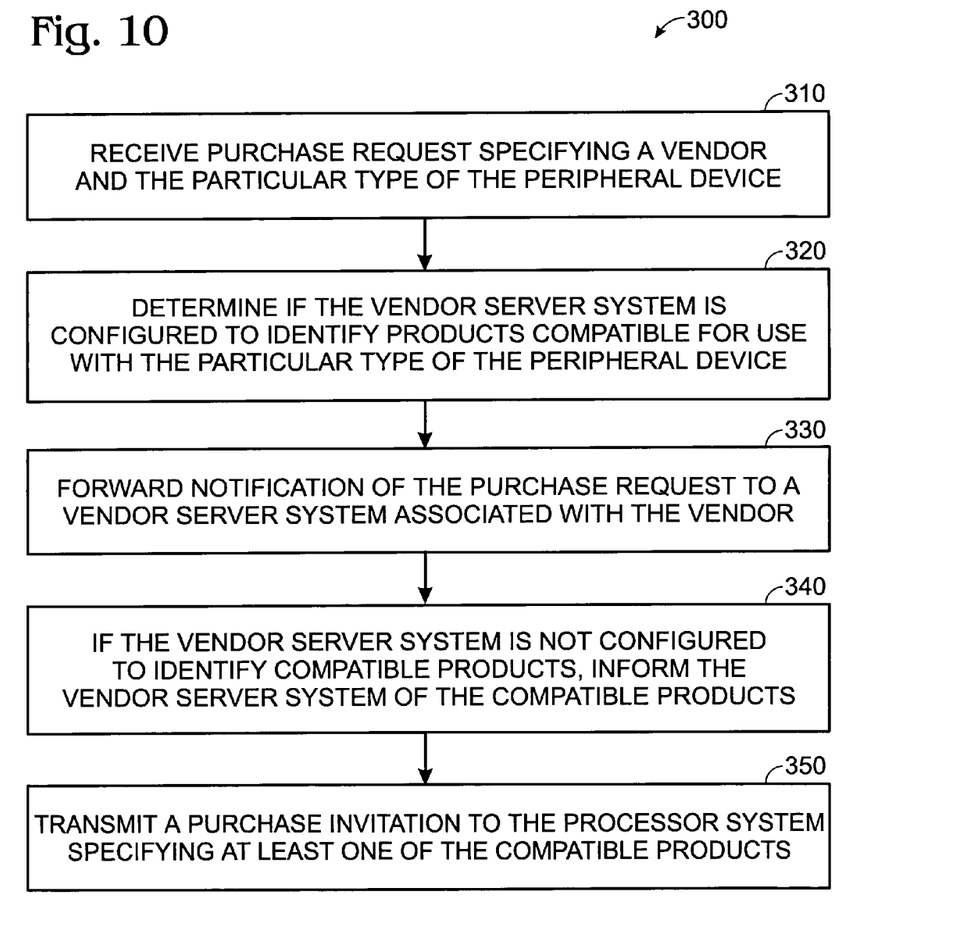
FIG. 10 is a flowchart illustrating a method of facilitating a purchase according to the present invention.

A further method according to the present invention is indicated generally at 300 in FIG. 10. Method 300 includes receiving a purchase request specifying a vendor and the particular type of the user's peripheral device, as indicated at step 310. Then, determining whether the vendor server system is configured to identify products compatible for use with the particular type of the peripheral device, as indicated at step 320. A notification of the purchase request is forwarded to a vendor server system associated with the specified vendor, as indicated at step 330. If the vendor server system is not configured to identify compatible products, the vendor server system is informed of the compatible products, as indicated at step 340. It will be appreciated that steps 330 and 340 may be combined by specifying the compatible products in the purchase request notification. In any event, a purchase invitation may then be transmitted to the processor system specifying at least one of the compatible products, as indicated at step 350.

Figure 11:
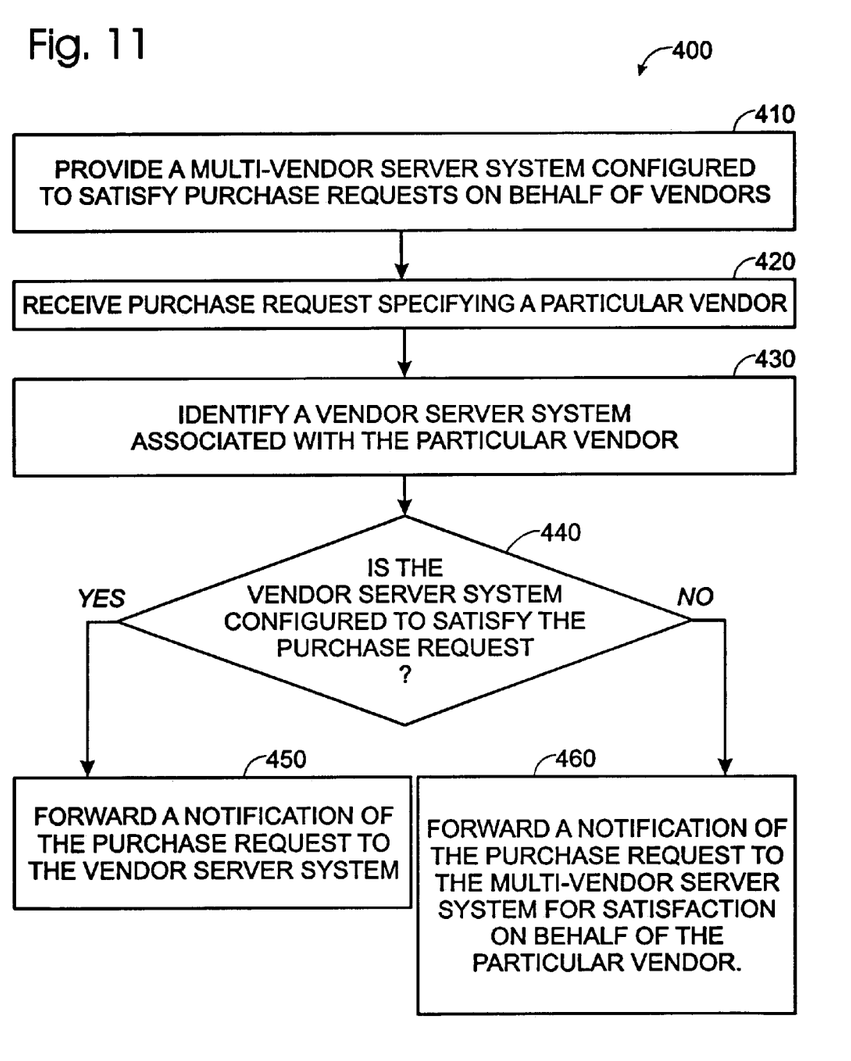
FIG. 11 is a flowchart illustrating a method of facilitating a purchase according to the present invention.

A still further method according to the present invention is indicated generally at 400 in FIG. 11. Method 400 includes providing a multi-vendor server system configured to satisfy purchase requests on behalf of vendors, at step 410. Receiving a purchase request specifying a particular vendor, at step 420. Identifying a vendor server system associated with the particular vendor, at step 430. Then determining whether the vendor server system is configured to satisfy the purchase request, as indicated at step 440. If the vendor server system is configured to satisfy the purchase request, a notification of the purchase request is forwarded to the vendor server system, as indicated at step 450. Conversely, if the vendor server system is not configured to satisfy the purchase request, a notification of the purchase request is forwarded to the multi-vendor server system for satisfaction on behalf of the particular vendor, as indicated at step 460.

As can be seen, the exemplary embodiments of system 20 provide a variety of methods for facilitating a user's purchases. While a few of such methods have been described above, it will be understood that many other methods for use with system 20 are included within the scope of the invention. Further, one or more steps may be added to, or omitted from, the methods described above as necessary or desired for a particular application.

Furthermore, while the present invention has been shown and described with reference to the foregoing operational principles and embodiments, it will be apparent to those skilled in the art that other changes in form and detail may be made without departing from the spirit and scope of the invention as defined in the appended claims.

We claim:

1. A computer-implemented method of enabling a user of a processor system to purchase ink cartridges for use with a printer of the processor system, where the printer is one of plural types, the method comprising:
   detecting a low-ink status in the printer;
   presenting a user-interface command element to the user in response to the low-ink status; and
   in response to actuation of the user-interface command element:
      electronically determining the particular type of the printer,
      informing a remote server system of the particular type of the printer via a communications network,
         identifying one or more ink cartridges that are compatible for use with the particular type of printer, and
      transmitting a purchase invitation to the processor system via the communications network, where the purchase invitation specifies at least one of the compatible products.

2. The method of claim 1, where the purchase invitation is in the form of an Internet web page offering the at least one compatible ink cartridge for sale.

3. The method of claim 1, where the step of identifying is performed by the remote server system.

4. The method of claim 1, where the step of transmitting is performed by a second remote server system associated with a product vendor.

5. The method of claim 4, where the step of identifying is performed by the remote server system, and further comprising informing the second remote server of the compatible products.

6. The method of claim 1, where the step of determining is performed by the processor system.

7. A computer-implemented method of enabling a user of a processor system to purchase products for use with a printer of the processor system, where the printer is one of plural types, the method comprising:
   receiving a print command from the user;
   in response to the print command, presenting a user-interface command element to the user; and
   in response to actuation of the user-interface command element:
      electronically determining the particular type of the printer,
      informing a remote server system of the particular type of the printer via a communications network,
         identifying one or more products that are compatible for use with the particular type of printer, and
      transmitting a purchase invitation to the processor system via the communications network, where the purchase invitation specifies at least one of the compatible products.

8. The method of claim 7, where the user-interface command element is presented to the user in an Internet web page.

9. The method of claim 8, where the Internet web page is transmitted to the processor system via the communications network from a second remote server system.

* * * * *

UNITED STATES PATENT AND TRADEMARK OFFICE
CERTIFICATE OF CORRECTION

PATENT NO. : 7,062,451 B1
APPLICATION NO. : 09/629254
DATED : June 13, 2006
INVENTOR(S) : Stephen D. Dentel et al.

It is certified that error appears in the above-identified patent and that said Letters Patent is hereby corrected as shown below:

Title Pg, Item (75), under "Inventors", in column 1, line 4, delete "Vancouver, WA" and insert -- Portland, OR --, therefor.

Signed and Sealed this

Eleventh Day of August, 2009

David J. Kappos
*Director of the United States Patent and Trademark Office*